June 5, 1956     F. A. GERGOVICH ET AL     2,748,532
SIMULATED MOTOR-SOUND PRODUCER
Filed April 27, 1954     2 Sheets-Sheet 1
FIG. 1
FIG. 2
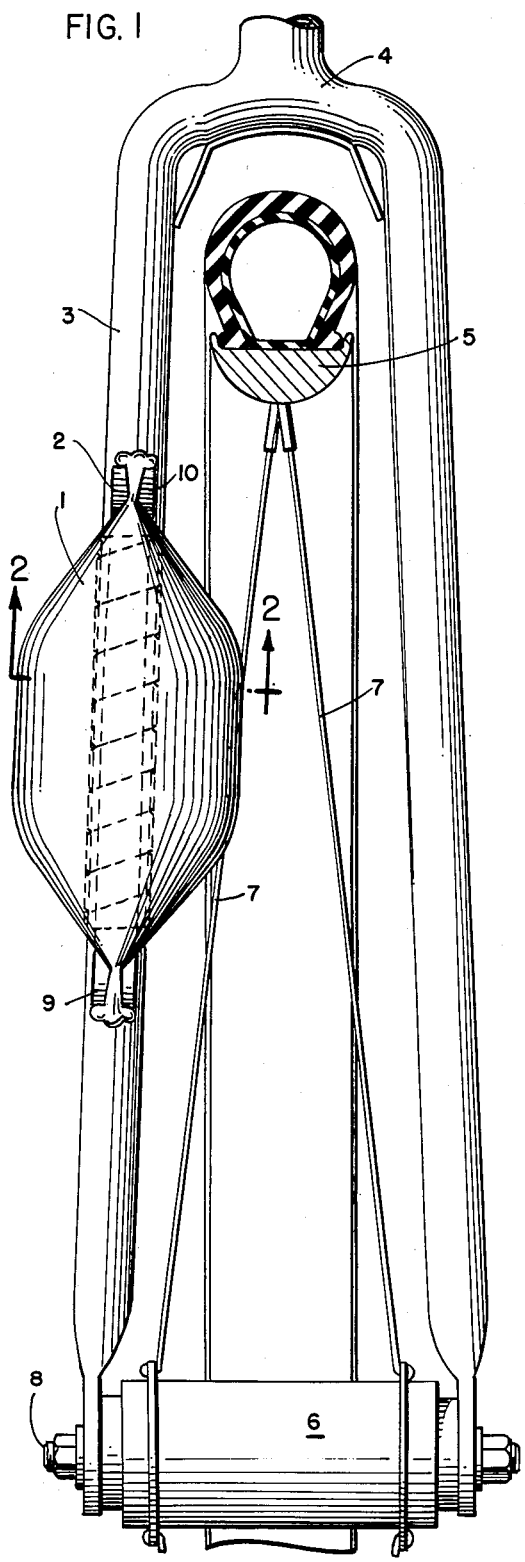
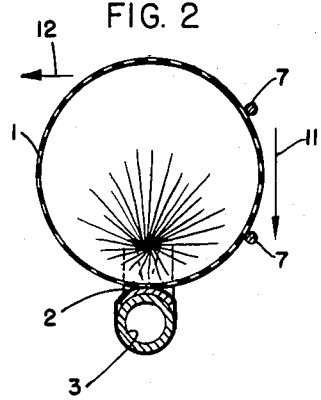
INVENTORS:
FRANK A. GERGOVICH
STANLEY S. LENSKI
BY *Rummler, Rummler & Snow*
ATT'YS

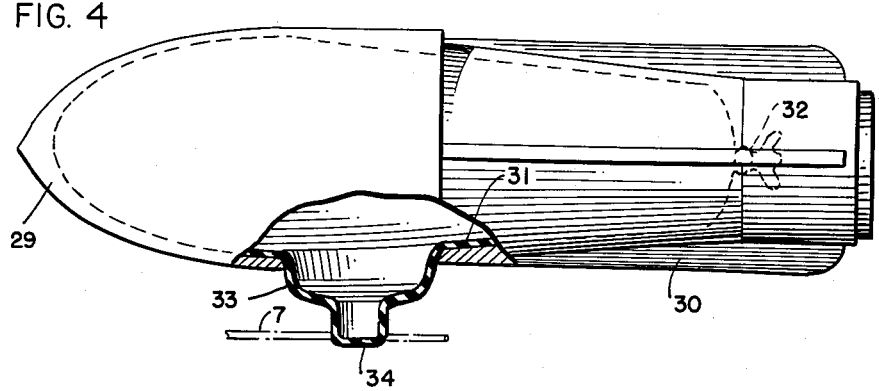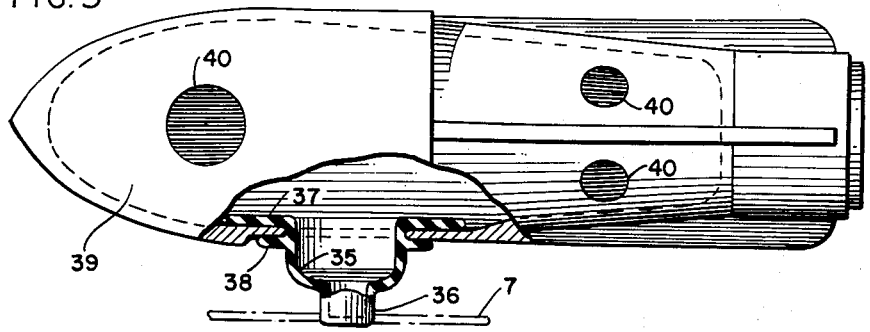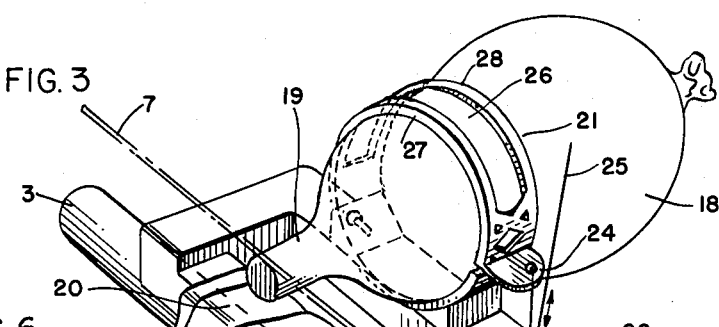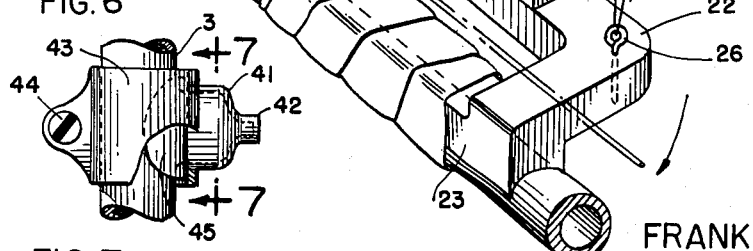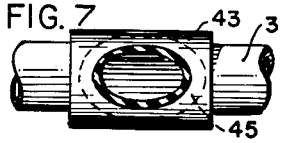

United States Patent Office 2,748,532
Patented June 5, 1956

2,748,532

SIMULATED MOTOR-SOUND PRODUCER

Frank A. Gergovich and Stanley S. Lenski, La Salle, Ill.

Application April 27, 1954, Serial No. 425,864

16 Claims. (Cl. 46—175)

This invention relates to improvements in sound producers, and particularly to such devices comprising a hollow body adapted to be repeatedly engaged by a continuous series of rapidly moving elements, such as the spokes of a wheel or teeth of an annular ratchet member, so as to produce sounds that are hollow or resonant as distinguished from the sharp clicking or clacking sound generated by the ordinary type of ratchet actuated noise making devices.

The main objects of this invention are to provide an improved sound producer which will simulate the sound of a rapidly operating internal combustion engine; to provide such a device comprising a hollow resonating body having a resilient elastic portion arranged for engagement by rapidly moving contacting elements and capable of producing sounds like that of a motor when so engaged; to provide such a device having a renewable elastic contact-actuated element that may be readily replaced when worn; to provide such a device comprising in combination, an inflated balloon and improved means for mounting the same in proximity with the spokes of a revolving wheel for continuous, rapidly repeated, engagement thereby; to provide an improved mounting means for attaching an inflated balloon to the frame of a bicycle in proximity with the bicycle wheel, for engagement with the spokes thereof as the wheel is revolved; to provide an improved means for mounting an inflated balloon on the frame of the bicycle whereby a portion only of the balloon body is subject to contact engagement with the spokes of the bicycle wheel as the same is revolved; and to provide such a device capable of varying the pressure within the inflated balloon to vary the sounds produced therefrom.

Further objects of this invention are to provide an improved form of hollow, elastic body for producing sounds simulating the exhaust sound of an operating motor; to provide such a device having an improved resilient contact element which when engaged by rapidly moving individual contacting elements will react with the body to simulate the sound of an internal combustion engine exhaust; to provide such a device which may be combined with a resonator for amplifying the sound; to provide such a device which is readily detachable from the resonator body for renewal for replacement of the sound producing element; and to provide an improved sound producing device capable of simulating the sounds of an internal combustion engine exhaust, and which is operable with or without a resonator.

Specific embodiments of this invention are shown in the accompanying drawings in which:

Figure 1 is a fragmentary plan view, showing a portion of a bicycle frame with an inflated elastic body mounted thereon in position for successive engagement by the spokes of the bicycle wheel to produce a noise.

Fig. 2 is a sectional view as taken on line 2—2 of Fig. 1, illustrating the manner in which the spokes of the bicycle wheel engage the inflated body.

Fig. 3 is a perspective view showing an arrangement of mounting means according to the present invention for securing an inflated body in position for repeated engagement by elements of a rotating body, the securing means being arranged for varying the pressure within the inflated body.

Fig. 4 is a partially sectioned view of a modified form of the invention combined with a resonator.

Fig. 5 is a similar view, showing another form of the invention wherein the sound producer is removably mounted on a resonator body.

Fig. 6 is a sectional view of still another modification of the invention, and

Fig. 7 is a sectional view as taken on line 7—7 of Fig. 6 to show the shape of the resonator portion of the sound producer body.

In the form shown in Fig. 1 of the drawings, the sound producing device comprises a hollow elastic somewhat ellipsoidal body 1, in the form of an inflated balloon, secured at each end to an elongate mounting means 2, which in turn is adapted to be mounted on one of the arms 3 of the wheel support of a bicycle frame 4. As shown, a wheel 5 having a hub 6 and a plurality of angularly spaced, radial spokes 7, for interconnecting the wheel and the hub, is journaled on suitable bearings at the outer end of the arms 3 for rotation about a fixed axle 8.

As shown in Figs. 1 and 2, the hollow elastic body or balloon 1 is of elongate form and inflated, and is knotted at each end whereby the ends of the balloon may be engaged in and held by the forked ears or lugs 9 and 10 at the ends of the mounting member. Thus, as shown in Fig. 2, the body of the inflated balloon 1 is supported so that it projects slightly into the path of the spoke 7 and upon being engaged by the spoke, as it moves in the direction of the arrow 11, the balloon body will be deflected laterally with a rolling motion in the direction of the arrow 12, the balloon body 1 being snapped back towards the spoke 7 by the elasticity of the body material at the tied ends which are secured to the mounting member 2. This rolling action of the balloon body produces the "bubbling" type of sound like the partially muffled exhaust of an internal combustion engine, and is particularly desirable when the devices is used on a bicycle and simulation of the sound of a motor is desired.

The particular mounting means illustrated in Fig. 2 is made as a simple stamping, the notched upturned ears or lugs 9 and 10 having an angle of about 30° from the plane of the longitudinal body portion of the mounting means or sufficient to permit the knotted ends of the balloon to be engaged, when the balloon is affixed. Also, the main body portion of the mounting means is curved, in transverse section, so that its upper surface is convex, and its lower surface is concave, to conform to the shape of the surface of the frame arm to which it is to be mounted.

This device may be attached to the frame member in any suitable manner, such for example as taping by means of electrical tape, having a non-sticky outer surface, which can be wrapped around and around the supporting member and the bar on which it is mounted, or by means of rubber bands or other tying means which will afford a firm frictional grip on both the mounting means and the frame bar.

In the operation of the inflated balloon type of noise maker thus far described, the balloon will preferably be of tubular form when not inflated, so that when the balloon is inflated it will be of elongate or ellipsoidal form rather than spherical. The closed end of this tubular form of balloon is first knotted and then after inflation, the open end of the balloon is knotted to prevent escape of the inflating air or gas. After the mounting member 2 is attached to the bicycle frame as indicated in Fig. 1, the knotted ends of the inflated balloon are engaged in the respective notched ends of the mounting means so that the balloon will be positioned lengthwise of the frame bar, and extend laterally into the path of the contacting elements 7, which make up the bicycle wheel structure, so that as the wheel is rotated, the elements 7, on the side of the wheel adjacent the balloon, will successively engage the side of the balloon, as indicated in Fig. 2, and upon each engagement cause the balloon to bounce laterally away from the contacting elements and then snap back thereby producing a series of rather sharp reports or noises in rapid succession like the exhaust sound of an operating motor.

In the improved form of the invention shown in Fig. 3, wherein an inflated balloon is also employed as a sound producing device, the balloon body 18 is also of elongate form, but is made with a closed end 19 of very much reduced diameter, so that when the balloon is inflated, the closed end will project axially like a nipple. As shown in Fig. 3 the end 20 of this nipple is preferably of rather flat form, although it should be understood that the usual rounded end may be employed if desired. In this form of the construction, the balloon is mounted in such a manner that the nipple 19 is presented endwise for engagement by the contacting elements, such as the bicycle wheel spokes 7, and the balloon is held by a circular clamp 21, which encircles the balloon body and which in turn is mounted on a bracket member 22, adapted to be secured on the frame member 3. The bracket 22 is of D form and projects laterally outward from the frame member 3, so that the clamp 21 will be spaced outwardly from the plane of the adjacent wheel spoke. As shown in Fig. 3 one leg 23 of the mounting bracket 22 is concaved on its bottom side for surface engagement with the tubular support bar 3, and the opposite leg, disposed laterally outward from the support, carries the circular clamp member 21.

The clamp member 21 is preferably in the form of an axially split band of cylindrical shape, one side of which is suitably mounted rigidly on the outer leg of the bracket 22, and the other side of which is free to move toward or away from the fixed side. The band 21 is split so that the opening between its ends is spaced above the upper surface of the bracket 22, and the free or unattached end of the band 21 is provided with an outwardly projecting ear or lug 24 whereby the free side of the band can be moved radially to enlarge or constrict the axial opening through the band.

Preferably the band 21 will be stiffly resilient, so as to provide a normal axial opening of predetermined diameter whereby, when an inflated balloon is disposed within the band, movement of the lug 24 in the downward direction will tend to constrict the opening and thereby squeeze or compress the balloon body, thus increasing the internal pressure within the balloon, and when the lug 24 is released the band 21 will spring back to its normal shape under the internal pressure of the balloon body.

As shown in Fig. 3, this operation of the balloon retaining band 21, to constrict or release the encircling pressure of the band on the body of the inflated balloon, may be had by means of a pull-string 25, which is attached to the lug 24 at one end and passes downwardly therefrom through the opening of an eye 26, and thence upwardly where it can be brought to convenient reach of the bicycle rider.

The operation of the band 21 to increase or release the encircling pressure on the body of the balloon 18, by changing the pressure of the gas within the balloon body, functions to change the tone or character of the sound produced by the body when the nipple 19 is engaged by the moving contact elements or spokes 7. Thus the sound can be made to be high or low pitched, either sharp or muffled, as the operator may desire by merely changing the tension on pull-string 25.

In the form shown in Fig. 3, the upper half of the clamping band 21, which encircles the balloon body and holds the balloon in proper position on the mounting bracket 22, has its central portion cut out as at 26, so that the upper half of the clamping band will be in the form of two narrow, axially spaced ribs 27 and 28. The purpose of this arrangement is to provide a more secure grip between the clamping member 21 and the body of the inflated balloon 18, so that the balloon will not work endwise or axially in the clamping member and thus possibly become released or shifted and so that the nipple 19 will be held in position to engage the moving contacting elements 7. When the balloon 18 is inflated and mounted within the clamping ring 21, the balloon body will tend to bulge radially outward through the opening 26, between the ribs 27 and 28, thereby permitting the ribs, which preferably have square corners, to obtain a firm grip on the balloon body.

In the operation of the arrangement shown in Fig. 3, the noise produced by the inflated balloon body 18, through engagement of the contact elements 7 with the nipple 19, is caused by the snapping action of the nipple 19 as it returns to its normal axial position relative to the balloon body after having been deflected by one of the contacting elements, and it has been found that by providing a square end 20 on the nipple 19, rather than the usual rounded end, this snapping action of the nipple is much more certain and rapid than if the end of the nipple were to be rounded. This may be due to the fact that when the contacting elements 7 engage a rounded surface at the end of the nipple, the tendency is to push the nipple axially of the balloon body rather than laterally, so that the snapping action of the nipple is very much reduced. At any rate it has been found that the square ended nipple produces a much more satisfactory sound than if the end of the nipple were to be formed otherwise.

In the form of the invention shown in Fig. 4, the invention is embodied in a construction comprising a hollow resonator shell, preferably moulded from plastic material and shaped to a fanciful form such as a torpedo or a bomb, adapted to encase an inflated elastic body having a laterally projecting nipple formation in its side wall which extends through a suitable opening in the side of the shell. As shown the moulded shell comprises a head portion 29, and a tail portion 30, which are suitably interfitted to form the complete resonator body, the two parts being separable for installation of the inflated balloon. In this case the balloon 31 is knotted only at its opening end 32, in order to retain the inflated air or gas. The balloon 31 is made with a laterally bulging dome-like portion or bell-shaped blister 33, on its side wall, which portion terminates in a nipple 34 of reduced diameter, so that when the balloon is inflated the nipple 34 will project stiffly from the balloon body substantially normal to the axis thereof. As shown, the opening in the side wall of the resonator body is made of sufficient size to permit the entire dome-like portion or blister 33 of the balloon to project without restriction.

This form of the invention, which is shown in top plan view in Fig. 4, may be adapted, in any convenient manner, for attachment to a suitable mounting means, such as the bracket 22 shown in Fig. 3, for attachment to the frame member of a bicycle adjacent the path of the bicycle wheel spokes and in such a manner that the nipple 34 will project slightly into the path of the spokes for engagement thereby. Thus the action of the nipple 34 when it is engaged by the spoke 7, is like that of the nipple 19 of the arrangement shown in Fig. 3, and the snapping or popping action of the nipple under the influence of the wheel spokes 7 will be substantially the same to produce a sound simulating that of a motor exhaust. The balloon body 31, however, being encased in the resonator shell will transmit the noise vibration to the shell, which will tend to intensify the sound.

In the form of the invention shown in Fig. 5, the improved noise maker comprises a hollow elastic body of bell-shaped form terminating at its closed end in a hollow cylindrical flat-ended nipple 36, and having a pair of annular axially spaced radial flanges 37 and 38 at its open end, by means of which the elastic body may be mounted in an annular opening in the side wall of a hollow resonator shell 39. As shown, the flange 37 is of greater diameter than the flange 38, and is adapted to engage the inner surface of the margin of the opening in the resonator body while the narrow flange 38 is adapted to engage the outer marginal surface of the opening. In this manner the elastic body is firmly attached to the resonator wall and when the wheel spokes 7 engage the nipple 36, the sound vibrations, caused by the nipple snapping back into normal position after having been deflected by one of the spokes 7, are transmitted directly to the body of the resonator shell 39 by which the sounds are considerably intensified. In this form of the invention the hollow elastic body 35 may be applied to a resonator of any desired shape or form, and, as shown in Fig. 5, the resonator is preferably provided with a plurality of holes or openings 40 in its side walls, whereby the sound produced by the snapping nipple, under the action of the spokes or contacting elements 7, may be more readily transferred to atmosphere.

While the resonator shells of Figs. 4 and 5 are not shown with a particular mounting means, it will be understood that the mounting member 22, shown in Fig. 3, may be employed for that purpose as aforesaid, the resonator shells being secured in any suitable fashion on the outer leg of the member 22 and in a position generally parallel therewith and with the plane of the wheel spokes 7 as indicated in Figs. 4 and 5.

In the form of the invention shown in Figs. 6 and 7, the improved sound producer comprises a hollow elastic body having an enlarged bell-shaped base portion 41, of oval cross section, from which a square ended cylindrical nipple 42 projects. This form of the invention is for direct application on the bicycle frame member 3 by means of an annular clamping ring 43, the ends of which are secured by means of a bolt and wing nut 44. As shown, the clamping ring 43 is provided with an oval shaped opening, midway between its bolted ends, to receive the body of the sound device, which in turn is provided with a peripheral radial flange 45 adapted to engage the inner surface of the clamping ring, and lie between the clamping ring and the frame member 3, so that when the clamping ring is secured by the bolt and nut 44, a tight frictional engagement will be had on the frame member 3 to prevent the clamp from turning out of its proper position.

In this form of the invention, the device is designed for mounting on the frame member 3 in such a manner that the nipple 42 will project slightly into the path of the spokes of the bicycle wheel, and engagement of the spoke on the end of the nipple 42, will cause the nipple to have the same snapping action as in the case of the arrangements shown in Figs. 3, 4 and 5. In this case the enlarged body portion of the hollow elastic body 41 serves as a resonator chamber, and preferably this chamber is made as large as may be conveniently done.

The main advantages of this invention reside in the provision of a simple, cheap, easily operated sound producing means that can be actuated by substantially any rotating member having individual contacting elements; in the fact that in its simplest form, wherein an elongate inflated balloon is employed as the sound producing element, the device can be easily and quickly mounted on a bicycle frame in the position most suitable for producing sounds like the exhaust sounds of an internal combustion motor; and in the fact that the improved noise producing element can be quickly and easily replaced when it becomes worn or broken and will be disposed in the correct position for most efficient operation without the necessity of adjustment.

Still further advantages are to be found in the improved combination of balloon and mounting means whereby the most effective motor exhaust sounds will automatically be obtained; and in the simple form and arrangement of a non-inflated elastic body capable of reacting, when engaged by a series of contact elements, to produce sounds closely simulating the exhaust sounds of an operating motor.

Although several embodiments of this invention are herein shown and described, it will be understood that details of the arrangements and constructions shown, may be altered or omitted without departing from the spirit of this invention as defined by the following claims.

We claim:

1. A simulated-motor-sound producer comprising in combination a frame having a member mounted therein for relative rotation about a fixed axis, said member having a plurality of individual contacting elements spaced angularly about said axis, a hollow body having an elastic nipple-like portion of reduced size projecting therefrom, a mounting means on said frame for holding said body adjacent said rotary member with the nipple-like portion extending toward said rotary member for engagement with successive ones of said contacting elements, and means for causing relative movement of said frame and said rotary member about said fixed axis.

2. A simulated-motor-sound producer comprising a frame and a wheel member mounted for relative rotation about a fixed axis in said frame, said wheel member having a plurality of individual angularly spaced contacting elements thereon, a hollow body having a resiliently yieldable nipple-like portion of reduced size projecting therefrom, and means on said frame for securing said body thereto adjacent said wheel member with the nipple-like portion positioned for engagement by successive ones of said contacting elements upon relative rotation of said wheel member and frame about said fixed axis.

3. A simulated-motor-sound producer comprising a frame and a wheel member mounted for relative rotation about a fixed axis in said frame, said wheel member having a plurality of individual angularly spaced contacting elements thereon, a hollow elastic body, and means on said frame for securing said body thereto adjacent said wheel member, said body having a resiliently yieldable nipple member projecting therefrom toward said wheel member for engagement by successive ones of said contacting elements upon relative rotation of said wheel member and frame about said fixed axis.

4. A simulated-motor-sound producer comprising a frame and a wheel member mounted for relative rotation about a fixed axis in said frame, said wheel member having a plurality of individual angularly spaced contacting elements thereon, a hollow elastic body, and means on said frame for securing said body thereto adjacent said wheel member, said body having a resiliently yieldable nipple projecting therefrom toward said wheel member for engagement by successive ones of said contacting elements upon relative rotation of said wheel member and frame about said fixed axis, and said nipple member terminating in a substantially flat end wall normal to the nipple member axis.

5. A motor-sound-producer for bicycles and the like having a wheel support arm and a spoked wheel mounted thereon for rotation in a plane substantially parallel therewith, comprising an elongate bracket mounted on said support arm parallel therewith, means on said bracket for securing a hollow body in a position adjacent the path of the wheel spokes, and a hollow body mounted on said bracket and having a resilient nipple-like portion thereon extending into the path of the wheel spokes for engagement thereby upon rotation of the wheel.

6. A motor-sound-producer for bicycles and the like having a wheel support arm and a spoked wheel mounted thereon for rotation in a plane parallel therewith, comprising a mounting member attached to said wheel support and having means for holding a hollow body adjacent the path of the wheel spokes, and a hollow elastic body secured on said mounting member and having a resilient nipple projecting into the path of the wheel spokes.

7. A motor-sound-producer for bicycles and the like having a wheel support arm and a spoked wheel mounted thereon for rotation in a plane parallel therewith, comprising a mounting member attached to said wheel support and having means for holding a hollow body adjacent the path of the wheel spokes, and a hollow elastic body secured on said mounting member and having a resilient nipple projecting into the path of the wheel spokes, said nipple having a substantially flat outer end.

8. A motor-sound-producer for bicycles and the like having a wheel support arm and a spoked wheel mounted thereon for rotation in a plane parallel therewith, comprising a mounting member attached to said wheel support and having means for holding a hollow body adjacent the path of the wheel spokes, and a hollow elastic body secured on said mounting member with the body axis normal to the plane of said wheel and having an axially projecting resilient nipple of reduced diameter extending into the path of the wheel spokes.

9. A motor-sound-producer for bicycles and the like having a wheel support arm and a spoked wheel mounted thereon for rotation in a plane parallel therewith, comprising a mounting member attached to said wheel support and having means for holding a hollow body adjacent the path of the wheel spokes, and a hollow elastic bell-shaped body secured on said mounting member with its axis substantially normal to the plane of said wheel, said body terminating in an axially projecting nipple of reduced diameter, and said nipple extending into the path of the spokes of said wheel.

10. A motor-sound-producer for bicycles and the like having a wheel support arm and a spoked wheel mounted thereon for rotation in a plane parallel therewith, comprising a bracket member mounted on said support arm substantially normal to the plane of said wheel, said bracket having an annular clamping band mounted thereon and lying in a plane parallel with the plane of said wheel, and an inflated elongate hollow body secured axially in said clamping band, said hollow body having an axially projecting resilient nipple at the end adjacent said wheel, and said nipple extending into the path of the wheel spokes.

11. A motor-sound producer for bicycles and the like having a wheel support arm and a spoked wheel mounted thereon for rotation in a plane parallel therewith, comprising a bracket member mounted on said support arm substantially normal to the plane of said wheel, an annular clamping means mounted sidewise on said bracket with its axis substantially normal to the plane of said wheel, said clamping means being axially split on one side and having means for pulling the free ends toward each other, and an inflated elastic body mounted in said clamping means and projecting axially therefrom, said body having a resilient nipple extending therefrom into the path of the wheel spokes.

12. A motor-sound producer for bicycles and the like having a wheel support arm and a spoked wheel mounted thereon for rotation in a plane parallel therewith comprising a bracket member mounted on said support arm substantially normal to the plane of said wheel, an annular clamping means mounted sidewise on said bracket with its axis substantially normal to the plane of said wheel, said clamping means being axially split on one side and having means for pulling the free ends toward each other, an inflated elastic body mounted in said clamping means and projecting axially therefrom, said body having a resilient nipple extending therefrom into the path of the wheel spokes, and means for adjusably contracting said clamping means against the radial pressure of said inflated elastic body.

13. A motor-sound producer comprising a hollow shell having a side wall opening, an elastic bell-shaped body mounted on said shell and extending laterally outward from said side wall opening, said elastic body terminating outwardly in a resilient nipple of reduced diameter, and means for mounting said shell adjacent a spoked wheel whereby said nipple will project endwise into the path of the wheel spokes.

14. A device of the class described comprising a bell-shaped hollow body of elastic material, open at its large end and having an axially projecting nipple at its other end, said nipple being of reduced diameter and terminating in a flat end substantially normal to the body axis, and means for mounting said body adjacent a spoked wheel with the nipples projecting endwise into the path of the wheel spokes.

15. A device of the class described comprising a bell-shaped hollow body of elastic material, open at its large end and having an axially projecting nipple at its other end, said body being of oval cross-section, and said nipple being of reduced diameter cylindrical form and terminating in a flat end substantially normal to the body axis, and means for mounting said body adjacent a spoked wheel with the nipple projecting endwise into the path of the wheel spokes.

16. A sound producer of the class described comprising a hollow elastic body having a bell-shaped portion terminating in an outwardly projecting resilient nipple of reduced diameter, a movable member having a series of successive contacting elements thereon for travel along a predetermined path upon movement of said member, and means for mounting said elastic body adjacent said movable member with said nipple projecting endwise into the path of said contacting elements.

References Cited in the file of this patent

UNITED STATES PATENTS

| | | |
|---|---|---|
| 1,180,681 | Wheelan | Apr. 25, 1916 |
| 1,543,954 | Shiva | June 30, 1925 |
| 2,367,430 | Redlund | Jan. 16, 1945 |
| 2,624,156 | Meyer | Jan. 6, 1953 |